(No Model.)
N. J. FELIX.
RAKE.
No. 491,703. Patented Feb. 14, 1893.
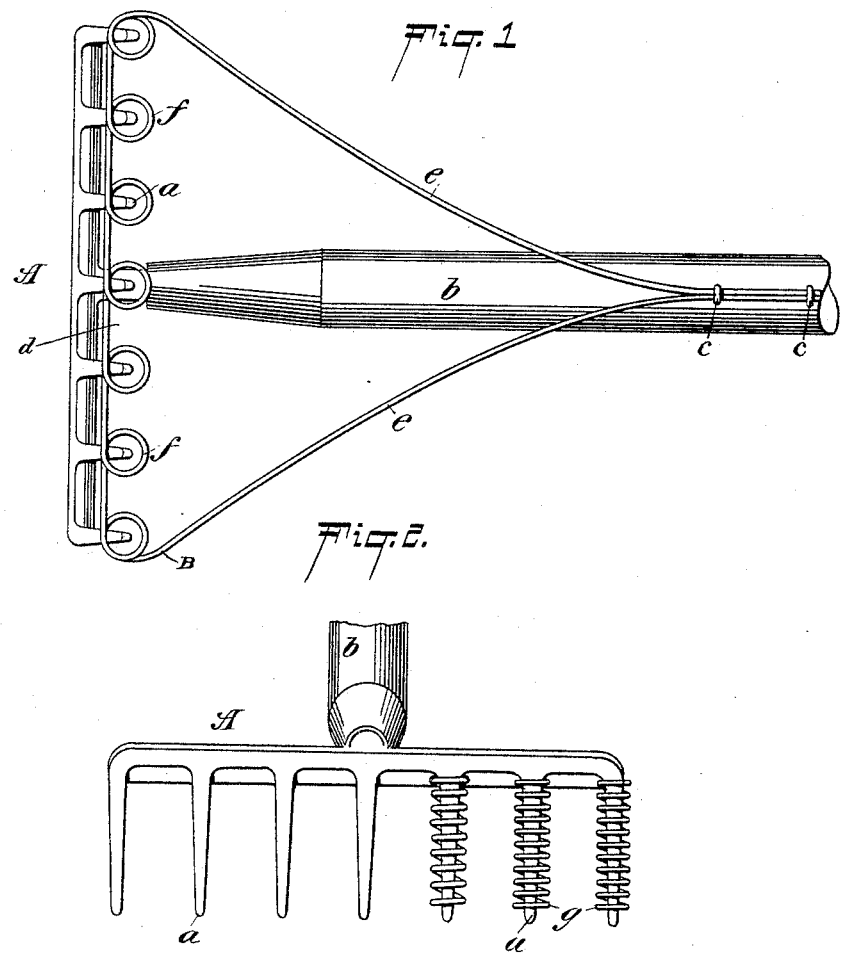
WITNESSES:
William Goebel,
Richard Lips
INVENTOR
Numa J. Felix
BY George Cook,
ATTORNEY.

UNITED STATES PATENT OFFICE.

NUMA J. FELIX, OF BROOKLYN, NEW YORK.

RAKE.

SPECIFICATION forming part of Letters Patent No. 491,703, dated February 14, 1893.

Application filed December 23, 1891. Serial No. 415,972. (No model.)

*To all whom it may concern:*

Be it known that I, NUMA J. FELIX, a citizen of the United States, and a resident of Brooklyn, in the county of Kings and State of New York, have invented certain new and useful Improvements in Rakes, of which the following is a specification.

My invention relates to an improvement in garden rakes, the object of the same being to provide an attachment to rakes of this kind for preventing the teeth thereof from becoming clogged with leaves, grass, refuse &c., while in use, and with this end in view my invention consists of certain novel features of construction as will hereinafter be fully described and pointed out in the claims.

In the accompanying drawings, Figure 1 is a bottom plan view of a rake having my improved rake guard applied thereto. Fig. 2 represents a modification of the rake guard.

A represents a rake of the ordinary construction, made of wood, metal or other desired material, and provided with the teeth *a*, and handle *b*.

B represents a guard made of spring wire, and preferably of one piece, the two ends thereof being secured to the under side of the handle *b*, as shown at *c*. This wire is bent as shown, that is, with the straight side *d* extending entirely across the teeth *a*, near their lower or pointed ends, and the two sides *e*, *e*, bent upwardly and inwardly, converging at the point where the ends thereof are secured to the handle. The straight portion *d* at certain points in its length is wound once around the teeth of the rake as shown at *f* in Fig. 1. The tendency of this guard or spring wire B is to keep and maintain its position with relation to the teeth *a*, that is, with the straight side *d* extending across the teeth near their lower ends and the coils *f* wrapped around the same so that when said teeth become filled or clogged with grass or leaves and the wire forced upwardly, said guard will when the teeth are lifted from the ground immediately return to its normal position and clear them of the foreign matter that may be clinging thereto. By this arrangement all necessity of stopping the raking in order to clear the teeth of the leaves or grass by the fingers is entirely obviated.

It will be obvious to those skilled in the art that I may vary somewhat the construction and arrangement of the guard, as for instance in the manner shown in Fig. 2, where it will be seen that the guard consists of a series of separate coiled wires *g* which are coiled around the series of teeth *a* as shown, said coils being secured to the upper part of the teeth or cross bar of the rake, or fastened in place in any other desirable or suitable manner.

What I claim as new, and desire to obtain by Letters Patent, is:—

1. The herein-described rake guard for preventing the teeth of the rake from becoming clogged, consisting of a single piece of spring wire, having one or more coils passing around a series of rake teeth, the free ends of said wire then extending backward to the rake handle to which they are firmly secured, substantially as described.

2. The combination with the rake A, of the rake guard for preventing the teeth of the rake from becoming clogged, which guard comprises a continuous piece of spring wire having a series of coils *f*, passing around the series of teeth *a*, and the free ends *e e* of said wire extending upwardly and inwardly and being secured to the rake handle *b* at the points *c c*, the whole combined and operating substantially in the manner described.

Signed at New York, in the county of New York and State of New York, this 22d day of December, A. D. 1891.

NUMA J. FELIX.

Witnesses:
GEORGE COOK,
WILLIAM GOEBEL.